US010422437B2

(12) United States Patent
Ishikawa et al.

(10) Patent No.: US 10,422,437 B2
(45) Date of Patent: Sep. 24, 2019

(54) SPOOL VALVE, OPERATION DEVICE, AND WORK VEHICLE

(71) Applicant: Komatsu Ltd., Tokyo (JP)

(72) Inventors: Satoshi Ishikawa, Oyama (JP);
Shinobu Nagura, Tochigi (JP);
Tomonobu Shioyasu, Oyama (JP);
Hirokazu Endoh, Oyama (JP);
Masayuki Tajima, Shimotsuke (JP);
Masayuki Hosaka, Oyama (JP)

(73) Assignee: Komatsu LTD, Tokyo (JP)

( * ) Notice: Subject to any disclaimer, the term of this patent is extended or adjusted under 35 U.S.C. 154(b) by 109 days.

(21) Appl. No.: 15/507,503

(22) PCT Filed: May 31, 2016

(86) PCT No.: PCT/JP2016/066080
§ 371 (c)(1),
(2) Date: Feb. 28, 2017

(87) PCT Pub. No.: WO2017/208374
PCT Pub. Date: Dec. 7, 2017

(65) Prior Publication Data
US 2018/0163888 A1    Jun. 14, 2018

(51) Int. Cl.
*F16K 11/07*    (2006.01)
*F16K 31/06*    (2006.01)
(Continued)

(52) U.S. Cl.
CPC ............... *F16K 31/06* (2013.01); *F16K 3/24* (2013.01); *F16K 3/314* (2013.01); *F16K 11/07* (2013.01);
(Continued)

(58) Field of Classification Search
CPC . F16K 31/06; F16K 3/24; F16K 3/314; F16K 11/07; F16K 11/0708;
(Continued)

(56) References Cited

U.S. PATENT DOCUMENTS 2,971,536 A    2/1961   Junck et al.
4,220,178 A    9/1980   Jackson
(Continued)

FOREIGN PATENT DOCUMENTS

CN    1491329 A       4/2004
CN    101617156 A    12/2009
(Continued)

OTHER PUBLICATIONS

International Search Report and Written Opinion dated Aug. 23, 2016, issued for PCT/JP2016/066080.
(Continued)

*Primary Examiner* — Kevin F Murphy
*Assistant Examiner* — Kelsey E Cary
(74) *Attorney, Agent, or Firm* — Locke Lord LLP

(57)    ABSTRACT

A spool valve includes: a valve body that has a spool hole; and a spool disposed in the spool hole and movable in an axial direction, wherein the spool has a first large-diameter portion, and a small-diameter portion provided on one side in the axial direction of the first large-diameter portion, the first large-diameter portion has a first outer surface slidable with an inner surface of the spool hole, an end surface connected to an end portion at the one side in the axial direction of the first outer surface and to an end portion at the other side in the axial direction of an outer surface of the small-diameter portion, and a cutout portion provided on the end surface, and a bottom surface of the cutout portion is inclined toward the one side in the axial direction to approach a central axis of the spool.

5 Claims, 10 Drawing Sheets

(51) Int. Cl.
*F16K 3/24* (2006.01)
*F16K 3/314* (2006.01)
*F16K 27/02* (2006.01)
*F16K 99/00* (2006.01)
*F15B 13/00* (2006.01)

(52) U.S. Cl.
CPC ........ *F16K 11/0708* (2013.01); *F16K 27/029* (2013.01); *F16K 99/0001* (2013.01); *F15B 2013/008* (2013.01)

(58) Field of Classification Search
CPC ................. F16K 27/029; F16K 99/001; Y10T 137/8671; Y10T 137/86694; Y10T 137/86622; Y10T 137/8667; F15B 13/00
USPC ............. 137/625.69, 625.67, 625.65, 625.25
See application file for complete search history.

(56) References Cited

U.S. PATENT DOCUMENTS

| | | |
|---|---|---|
| 4,941,508 A | 7/1990 | Hennessy et al. |
| 6,450,194 B1 | 9/2002 | Wasson et al. |
| 7,950,416 B2 | 5/2011 | Nakai et al. |
| 2004/0089355 A1 | 5/2004 | Nirasawa et al. |
| 2008/0308757 A1 | 12/2008 | Nakai et al. |
| 2015/0247585 A1 | 9/2015 | Takanishi et al. |

FOREIGN PATENT DOCUMENTS

| | | |
|---|---|---|
| CN | 104896167 A | 9/2015 |
| DE | 4040523 A1 | 7/1991 |
| EP | 0301726 A1 | 2/1989 |
| JP | 56-156563 A | 12/1981 |
| JP | 56-167969 A | 12/1981 |
| JP | 2006-105283 A | 4/2006 |
| JP | 2012-154389 A | 8/2012 |
| WO | 79/00947 A1 | 11/1979 |
| WO | 2008/155929 A1 | 12/2008 |

OTHER PUBLICATIONS

Office Action dated Apr. 6, 2018, issued for the the corresponding German patent application No. 112016000086.3.

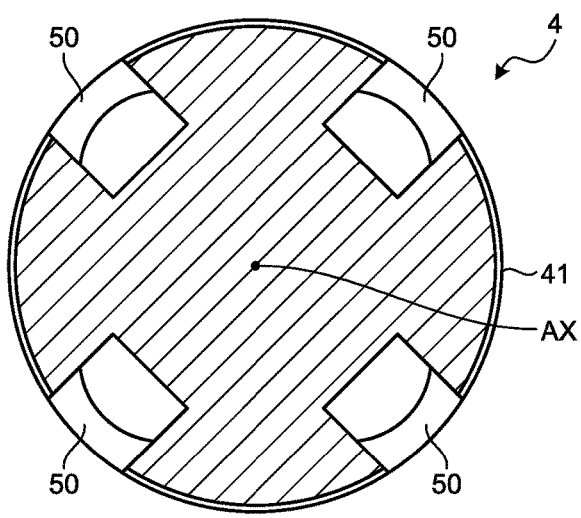
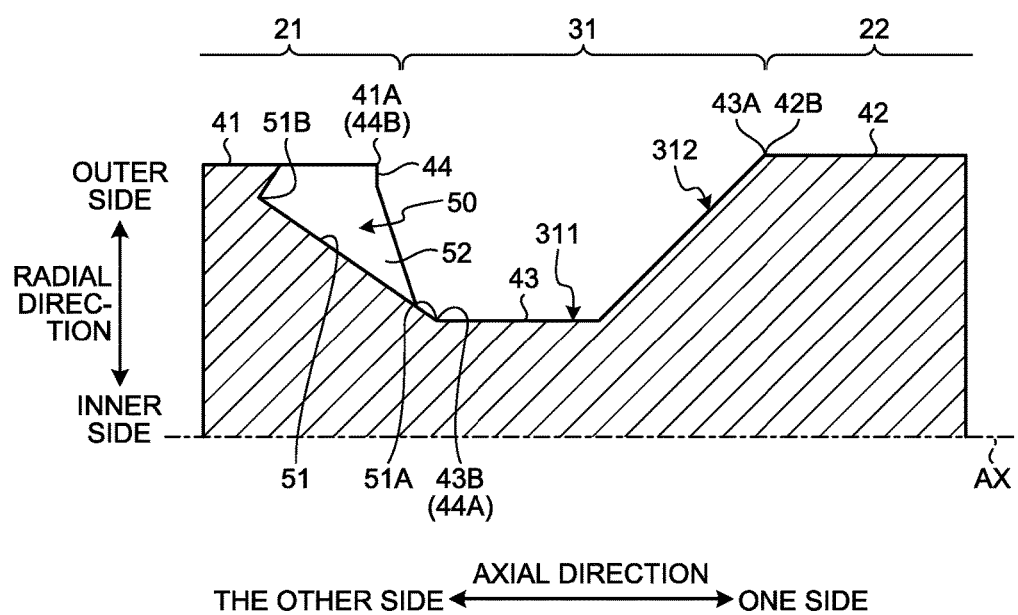

SPOOL VALVE, OPERATION DEVICE, AND WORK VEHICLE

FIELD

The present invention relates to a spool valve, an operation device, and a work vehicle.

BACKGROUND

In a hydraulic circuit, a hydraulic control valve controls speed, force, a position, and a direction of a hydraulic cylinder by controlling pressure, flow rate, and a direction of flow of working oil. A spool valve, which is a slide-type hydraulic control valve, includes a valve body that has a spool hole, and a spool disposed in the spool hole and movable in an axial direction. The spool valve moves the spool in the axial direction so as to control the working oil supplied to the hydraulic cylinder.

CITATION LIST

Patent Literature

Patent Literature 1: JP 2006-105283 A
Patent Literature 2: JP 2012-154389 A

SUMMARY

Technical Problem

In an excavator, a boom of a working unit is driven by a boom cylinder. By an operation of an operation lever by an operator, the boom is raised when the boom cylinder is extended, and the boom is lowered when the boom cylinder is contracted. One of the causes of a decline in fine control performance when the boom is lowered is flow force that acts on a spool. The fine control performance refers to control performance of working unit speed. More specifically, the fine control performance refers to a relationship between a stroke (pilot pressure) of the operation lever and a spool stroke. If the flow force can be reduced, the decline in the fine control performance will be suppressed.

An aspect of the present invention has an object to provide a spool valve, an operation device, and a work vehicle that can suppress a decline in fine control performance by reducing flow force that acts on a spool.

Solution to Problem

According to a first aspect of the present invention, a spool valve comprises: a valve body that has a spool hole; and a spool disposed in the spool hole and movable in an axial direction, wherein the spool has a first large-diameter portion, and a small-diameter portion provided on one side in the axial direction of the first large-diameter portion, the first large-diameter portion has a first outer surface slidable with an inner surface of the spool hole, an end surface connected to an end portion at the one side in the axial direction of the first outer surface and to an end portion at the other side in the axial direction of an outer surface of the small-diameter portion, and a cutout portion provided on the end surface, and a bottom surface of the cutout portion is inclined toward the one side in the axial direction to approach a central axis of the spool.

According to a second aspect of the present invention, an operation device operates the spool valve according to the first aspect.

According to a third aspect of the present invention, a work vehicle comprises the operation device according to the second aspect.

Advantageous Effects of Invention

According to an aspect of the present invention, there is provided a spool valve that can suppress a decline in fine control performance by reducing flow force that acts on a spool.

BRIEF DESCRIPTION OF DRAWINGS

FIG. 2 is a cross-sectional view illustrating an example of a spool according to the present embodiment.
FIG. 3 is a partially enlarged cross-sectional view of the spool according to the present embodiment.

DESCRIPTION OF EMBODIMENTS

In the following, an embodiment of the present invention will be described with reference to the drawings. However, the present invention is not limited to the embodiment. The components of the embodiment described below can optionally be combined. Furthermore, there may be a case where some of the components are not used.

Figure 1:
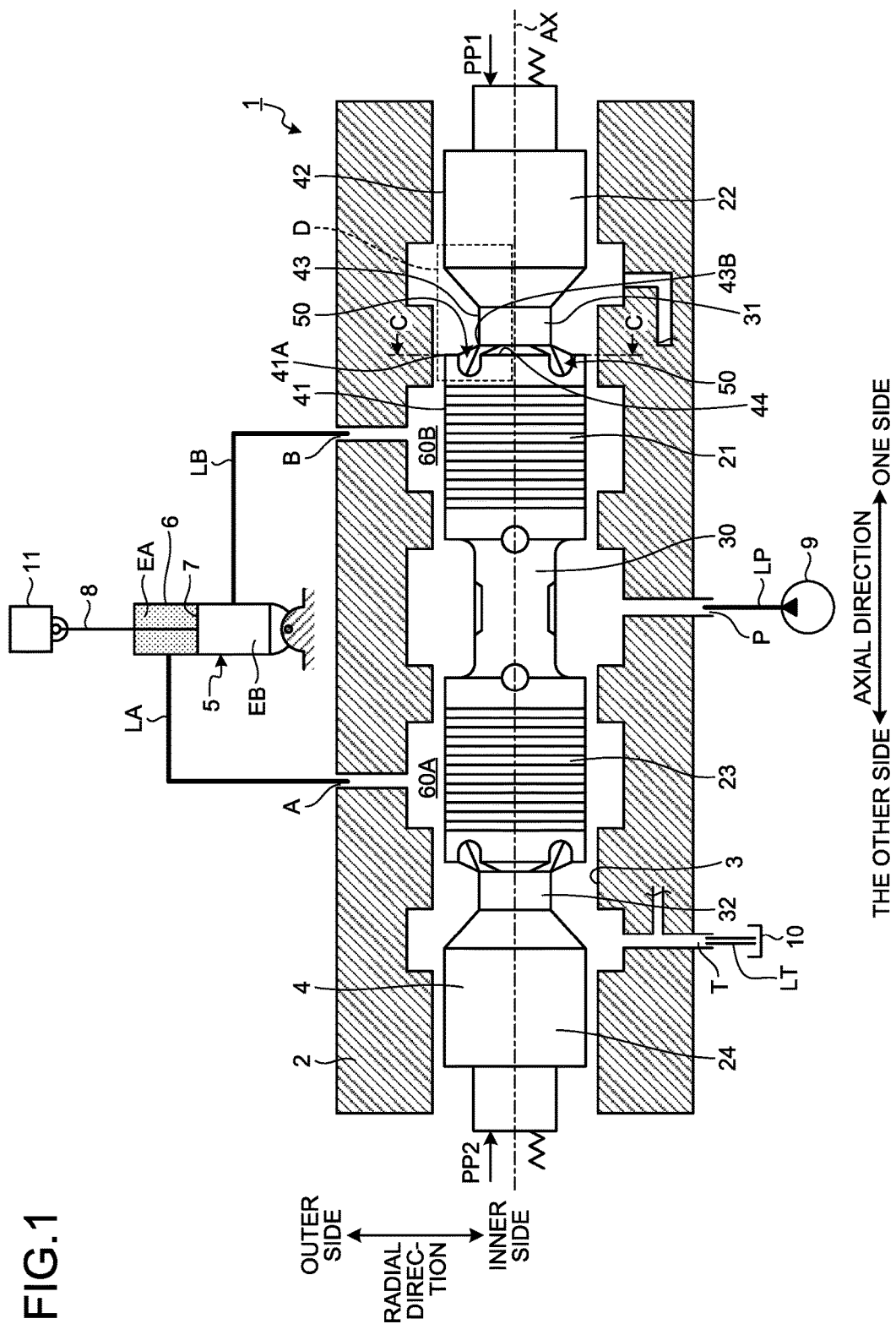
FIG. 1 is a diagram illustrating an example of a spool valve according to the present embodiment.

FIG. 1 is a diagram illustrating an example of a spool valve 1 according to the present embodiment. The spool valve 1 is a slide-type spool valve. As illustrated in FIG. 1, the spool valve 1 includes a valve body 2 that has a spool hole 3, and a spool 4 disposed in the spool hole 3 and movable in an axial direction.

The spool 4 has a central axis AX. In the present embodiment, a direction parallel to the central axis AX is referred to as an axial direction, a radiation direction with respect to the central axis AX is referred to as a radial direction, and a rotation direction around the central axis AX is referred to as a circumferential direction. Moreover, in the axial direction, a predetermined direction is appropriately referred to as one side in the axial direction, and a direction opposite to the predetermined direction is appropriately referred to as the other side in the axial direction. Furthermore, a direction approaching the central axis AX in the radial direction is appropriately referred to as an inner side in the radial direction, and a direction moving away from the central axis AX in the radial direction is appropriately referred to as an outer side in the radial direction.

The spool valve 1 moves the spool 4 in the axial direction so as to control working oil supplied to a hydraulic cylinder 5. The hydraulic cylinder 5 is, for example, a boom cylinder of an excavator. The hydraulic cylinder 5 has a cylinder 6, a piston 7 movable inside the cylinder 6, and a cylinder rod 8 connected to the piston 7. The inside of the cylinder 6 is partitioned into a cylinder head-side oil chamber EA and a cylinder bottom-side oil chamber EB by the piston 7.

The valve body 2 has a head-side port A, a bottom-side port B, a pump port P, and a tank port T. In addition, the valve body 2 has an annular groove 60A connected to the head-side port A, and an annular groove 60B connected to the bottom-side port B.

The head-side port A is connected to the cylinder head-side oil chamber EA of the hydraulic cylinder 5 via an oil passage LA. The bottom-side port B is connected to the cylinder bottom-side oil chamber EB of the hydraulic cylinder 5 via an oil passage LB. The pump port P is connected to a hydraulic pump 9 via an oil passage LP. The tank port T is connected to a tank 10 via an oil passage LT. Note that FIG. 1 illustrates an example in which the spool 4 is disposed at a neutral position.

The spool 4 moves in the axial direction by a pilot pressure PP1 and a pilot pressure PP2. When an operator operates an operation lever, an electromagnetic proportional control valve is actuated based on the operation amount of the operation lever. When the electromagnetic proportional control valve is actuated, the pilot pressures PP1 and PP2 corresponding to the operation amount of the electromagnetic proportional control valve act on the spool 4. In the present embodiment, when the pilot pressure PP1 acts on the spool 4, the spool 4 moves to the other side in the axial direction. When the pilot pressure PP2 acts on the spool 4, the spool 4 moves to one side in the axial direction.

In addition, springs are provided between both end portions of the valve body 2 and both end portions of the spool 4, and reaction force is provided to the pilot pressures PP1 and PP2 exerted from the both end portions. In a case where the pilot pressures PP1 and PP2 do not act on the spool 4, the spool 4 is disposed at the neutral position by the springs.

When the working oil is supplied from the spool valve 1 to the cylinder head-side oil chamber EA via the head-side port A, in the hydraulic cylinder 5, the cylinder rod 8 connected to the piston 7 is contracted. When the cylinder rod 8 is contracted, a boom 11 connected to a distal end portion of the cylinder rod 8 is lowered. When the working oil is supplied from the spool valve 1 to the cylinder bottom-side oil chamber EB via the bottom-side port B, in the hydraulic cylinder 5, the cylinder rod 8 connected to the piston 7 is extended. When the cylinder rod 8 is extended, the boom 11 connected to the distal end portion of the cylinder rod 7 is raised.

The spool 4 has a first large-diameter portion 21, a second large-diameter portion 22, a third large-diameter portion 23, and a fourth large-diameter portion 24. The second large-diameter portion 22 is provided on one side in the axial direction of the first large-diameter portion 21. The third large-diameter portion 23 is provided on the other side in the axial direction of the first large-diameter portion 21. The fourth large-diameter portion 24 is provided on the other side in the axial direction of the third large-diameter portion 23.

Furthermore, the spool 4 has a small-diameter portion 30, a small-diameter portion 31, and a small-diameter portion 32. The small-diameter portion 30 is provided between the first large-diameter portion 21 and the third large-diameter portion 23. The small-diameter portion 31 is provided between the first large-diameter portion 21 and the second large-diameter portion 22. The small-diameter portion 32 is provided between the third large-diameter portion 23 and the fourth large-diameter portion 24.

The small-diameter portion 31 is provided on the one side in the axial direction of the first large-diameter portion 21. The second large-diameter portion 22 is provided on one side in the axial direction of the small-diameter portion 31. The small-diameter portion 32 is provided on the other side in the axial direction of the third large-diameter portion 23. The fourth large-diameter portion 24 is provided on the other side in the axial direction of the small-diameter portion 32.

In the present embodiment, the spool 4 is symmetrical to a center in the axial direction. That is, the first large-diameter portion 21, the small-diameter portion 31, and the second large-diameter portion 22, and the third large-diameter portion 23, the small-diameter portion 32, and the fourth large-diameter portion 24 substantially have the same structure, respectively. In the following description, the first large-diameter portion 21, the small-diameter portion 31, and the second large-diameter portion 22 will be mainly described, and descriptions of the third large-diameter portion 23, the small-diameter portion 32, and the fourth diameter portion 24 will be simplified or omitted. Note that the spool 4 may be asymmetrical to the center in the axial direction.

Figure 4:
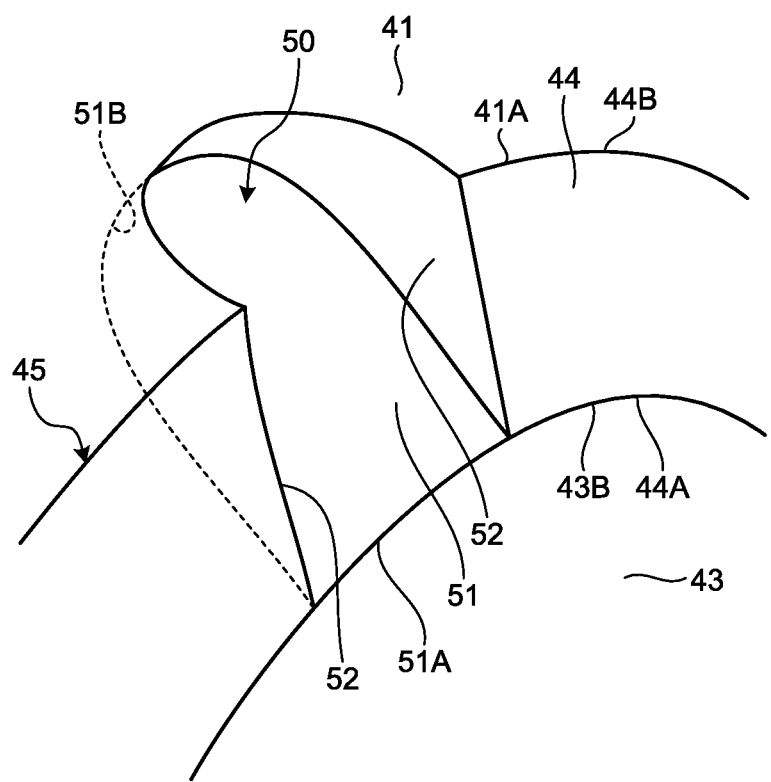
FIG. 4 is a partially enlarged perspective view of the spool according to the present embodiment.

FIG. 2 is a cross-sectional view illustrating an example of the spool 4 according to the present embodiment, and corresponds to a sectional view from an arrow of line C-C in FIG. 1. FIG. 3 is a partially enlarged cross-sectional view of the spool 4 according to the present embodiment, and corresponds to a sectional view of a portion D in FIG. 1. FIG. 4 is a partially enlarged perspective view of the spool 4 according to the present embodiment.

As illustrated in FIGS. 1, 2, 3, and 4, the first large-diameter portion 21 has a first outer surface 41, an end surface 44, and a cutout portion 50. The first outer surface 41 is slidable with an inner surface of the spool hole 3. The end surface 44 is connected to an end portion 41A at one side in the axial direction of the first outer surface 41, and to an end portion 43B at the other side in the axial direction of an outer surface 43 of the small-diameter portion 31. The cutout portion 50 is provided on the end surface 44.

The end surface 44 faces one side in the axial direction. The end surface 44 has an annular-belt shape. The end surface 44 has an end portion 44A at the inner side in the radial direction, and an end portion 44B at the outer side in the radial direction. The end portion 41A of the first outer surface 41 and the end portion 44B of the end surface 44 are connected to each other. The end portion 44A of the end surface 44 and the end portion 43B of the outer surface 43 are connected to each other. In the present embodiment, the end portion 41A of the first outer surface 41 and the end portion 44B of the end surface 44 coincide with each other. The end portion 44A of the end surface 44 and the end portion 43B of the outer surface 43 coincide with each other.

The cutout portion 50 is formed so that a portion of the first outer surface 41 and a portion of the end surface 44 are cut out. In other words, the cutout portion 50 is formed so that a corner portion 45 defined by the first outer surface 41 and the end surface 44 is cut out.

In the present embodiment, four cutout portions 50 are provided at equal intervals in the circumferential direction. There may be provided, in the circumferential direction, two cutout portions 50, six cutout portions 50, or eight cutout portions 50.

The small-diameter portion 31 has a straight body portion 311 and a tapered portion 312. The straight body portion 311 is adjacent to the first large-diameter portion 21. The tapered portion 312 is provided on one side in the axial direction of the straight body portion 311.

The straight body portion 311 is a portion that has a constant radius. The radius of the straight body portion 311 is a distance between the central axis AX and the outer surface 43 in the straight body portion 311.

The tapered portion 312 is a portion where a radius increases toward one side in the axial direction. The radius of the tapered portion 312 is a distance between the central axis AX and the outer surface 43 in the tapered portion 312.

An end portion 43A at the one side in the axial direction of the outer surface 43 of the small-diameter portion 31 is connected to an end portion 42B at the other side in the axial direction of a second outer surface 42 of the second large-diameter portion 22. In the present embodiment, the end portion 43A of the outer surface 43 and the end portion 42B of the second outer surface 42 coincide with each other.

In the present embodiment, the end portion 43B is an end portion at the other side in the axial direction of the straight body portion 311. The end portion 43A is an end portion at the one side in the axial direction of the tapered portion 312.

As illustrated in FIGS. 3 and 4, the cutout portion 50 has a bottom surface 51, and a wall surface 52 disposed to surround the bottom surface 51.

In the present embodiment, the bottom surface 51 of the cutout portion 50 is a flat surface. The bottom surface 51 of the cutout portion 50 has an end portion 51A at one side in the axial direction, and an end portion 51B at the other side in the axial direction.

In the present embodiment, the bottom surface 51 of the cutout portion 50 is inclined toward the one side in the axial direction so as to approach the central axis AX of the spool 4. That is, the end portion 51A is disposed on the inner side in the radial direction of the end portion 51B.

In the present embodiment, the end portion 51A at the one side in the axial direction of the bottom surface 51 is connected to the end portion 43B at the other side in the axial direction of the outer surface 43 of the small-diameter portion 31. In the present embodiment, the end portion 51A of the bottom surface 51 and the end portion 43B of the outer surface 43 substantially coincide with each other.

Figure 5:
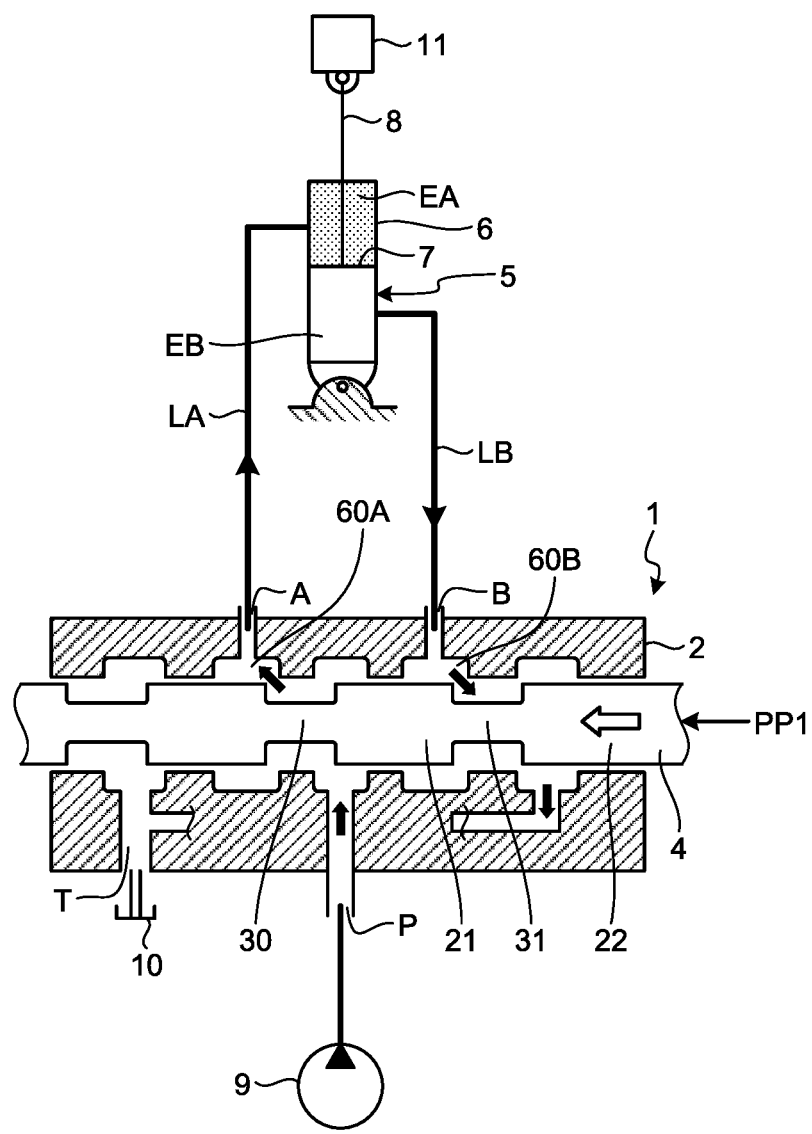
FIG. 5 is a schematic view illustrating an exemplary movement of the spool valve according to the present embodiment.

Next, an exemplary movement of the spool valve 1 according to the present embodiment will be described. FIG. 5 is a schematic view illustrating the exemplary movement of the spool valve 1 according to the present embodiment. For example, when the operator operates the operation lever to lower the boom 11 of the excavator, the electromagnetic proportional control valve is actuated based on the operation amount of the operation lever. When the electromagnetic proportional control valve is actuated, the pilot pressure PP1 corresponding to the operation amount of the electromagnetic proportional control valve acts on the spool 4. As illustrated in FIG. 5, when the pilot pressure PP1 acts on the spool 4, the spool 4 moves to the other side in the axial direction. When the spool 4 moves to the other side in the axial direction, the working oil supplied from the hydraulic pump 9 is discharged from the head-side port A via the annular groove 60A after passing the small-diameter portion 30. The working oil discharged from the head-side port A is supplied to the cylinder head-side oil chamber EA via the oil passage LA. Accordingly, the hydraulic cylinder 5 is contracted and thus, the boom 11 is lowered. In addition, the working oil discharged from the cylinder bottom-side oil chamber EB is supplied to the annular groove 60B via the oil passage LB and the bottom-side port B. The working oil supplied to the annular groove 60B makes contact with a portion of the first large-diameter portion 21, and is recovered by the tank 10 via the tank port T after passing the small-diameter portion 31.

When the spool 4 moves to the other side in the axial direction, there is a possibility that, depending on a shape of the cutout portion 50, flow force opposite to the moving direction of the spool 4 acts on the spool 4.

Figure 6:
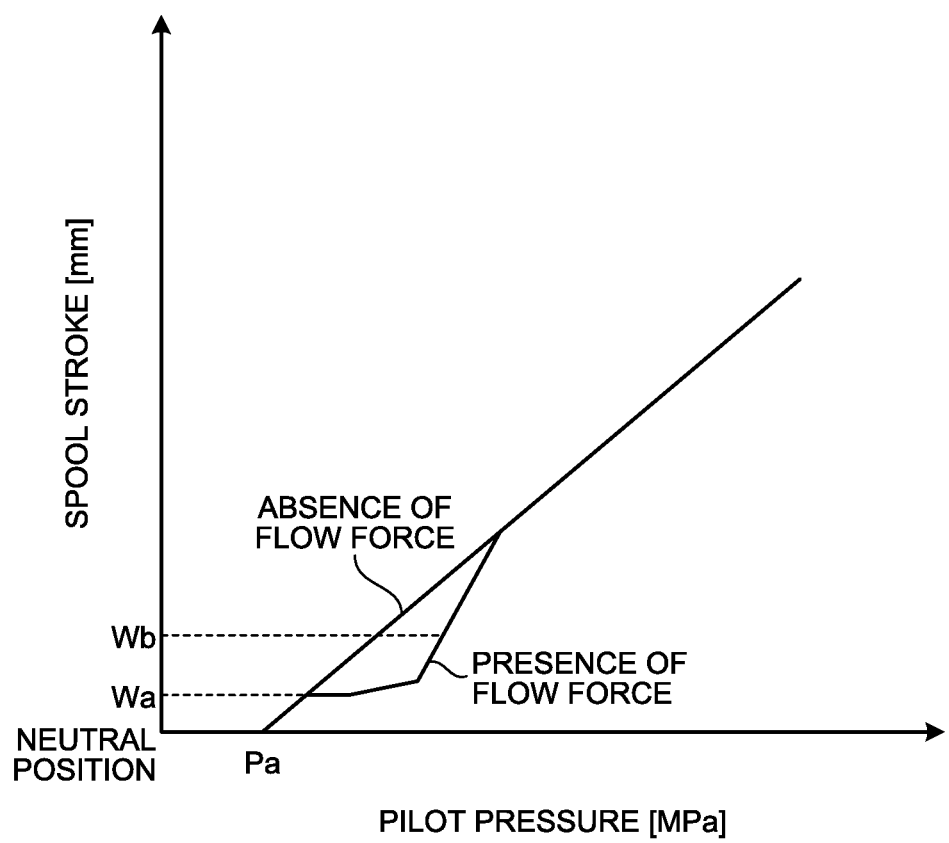
FIG. 6 is a diagram illustrating a relationship between a pilot pressure, which acts on the spool, and a spool stroke.

FIG. 6 is a diagram illustrating a relationship between the pilot pressure PP1 that acts on the spool 4 and a spool stroke which is the moving amount of the spool 4. When the operation lever is operated by the operator in a state where the spool 4 is disposed at the neutral position, the pilot pressure PP1 corresponding to the operation amount of the operation lever acts on the spool 4. When the pilot pressure PP1 gradually increases and exceeds a value Pa, the spool 4 starts moving to the other side in the axial direction.

When the spool 4 starts moving and moves by a first distance Wa from the neutral position, a portion of the cutout portion 50 is disposed in the annular groove 60B of the valve body 2. When the spool 4 moves by a second distance Wb from the neutral position, the entire cutout portion 50 is disposed in the annular groove 60B, and a portion of the small-diameter portion 31 is disposed in the annular groove 60B.

Between the first distance Wa and the second distance Wb, the working oil from the bottom-side port B mainly passes the cutout portion 50. Therefore, there is a possibility that, depending on the shape of the cutout portion 50, the flow force of the working oil opposite to the moving direction of the spool 4 acts on the spool 4. As a result, as illustrated in FIG. 6, the linearity of the spool stroke with respect to the pilot pressure corresponding to the operation amount of the operation lever is lost and thus, the fine control performance declines.

In the present embodiment, the bottom surface 51 of the cutout portion 50 is inclined toward the one side in the axial direction so as to approach the central axis AX of the spool 4. Therefore, the flow force can be reduced.

Figure 7:
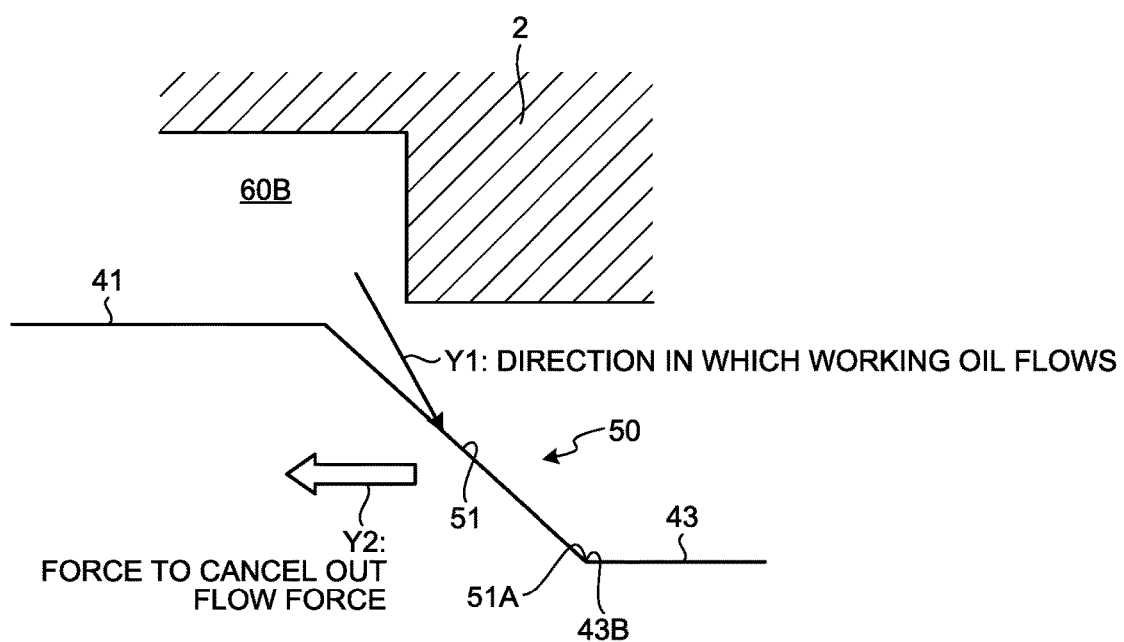
FIG. 7 is a schematic view for describing an action of a bottom surface of a cutout portion according to the present embodiment.

FIG. 7 is a schematic view for describing an action of the bottom surface 51 of the cutout portion 50 according to the present embodiment. As illustrated in FIG. 7, as the cutout portion 50 comes close to the annular groove 60B, the working oil supplied from the bottom-side port B to the annular groove 60B flows through the cutout portion 50. At least portion of the working oil hits the bottom surface 51 of the cutout portion 50. The working oil hits the bottom surface 51 while having a vector component illustrated by an arrow Y1 in FIG. 7. As a result, a component force of the working oil having a vector component illustrated by an arrow Y2 is generated and acts on the bottom surface 51.

The component force of the working oil illustrated by the arrow Y2 acts on the bottom surface 51 to cancel out the flow force. As a result, the flow force is reduced.

Moreover, in the present embodiment, the end portion 51A at the one side in the axial direction of the bottom surface 51 is connected to the end portion 43B at the other side in the axial direction of the outer surface 43 of the small-diameter portion 31. As a result, the flow force can be reduced more effectively.

Figure 8:
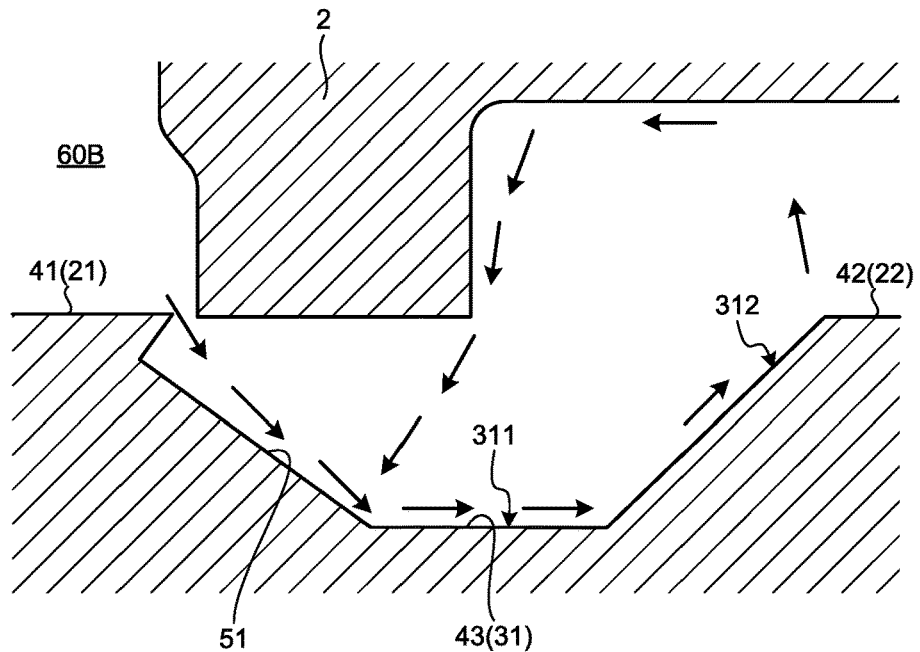
FIG. 8 is a schematic view for describing the action of the bottom surface of the cutout portion according to the present embodiment.

FIG. 8 is a schematic view for describing the action of the bottom surface 51 of the cutout portion 50 according to the present embodiment. As illustrated in FIG. 8, the working oil from the annular groove 60B, after flowing along the bottom surface 51, reaches the outer surface 43 of the small-diameter portion 31. Accordingly, generation of negative pressure in the cutout portion 50 is suppressed.

Figure 9:
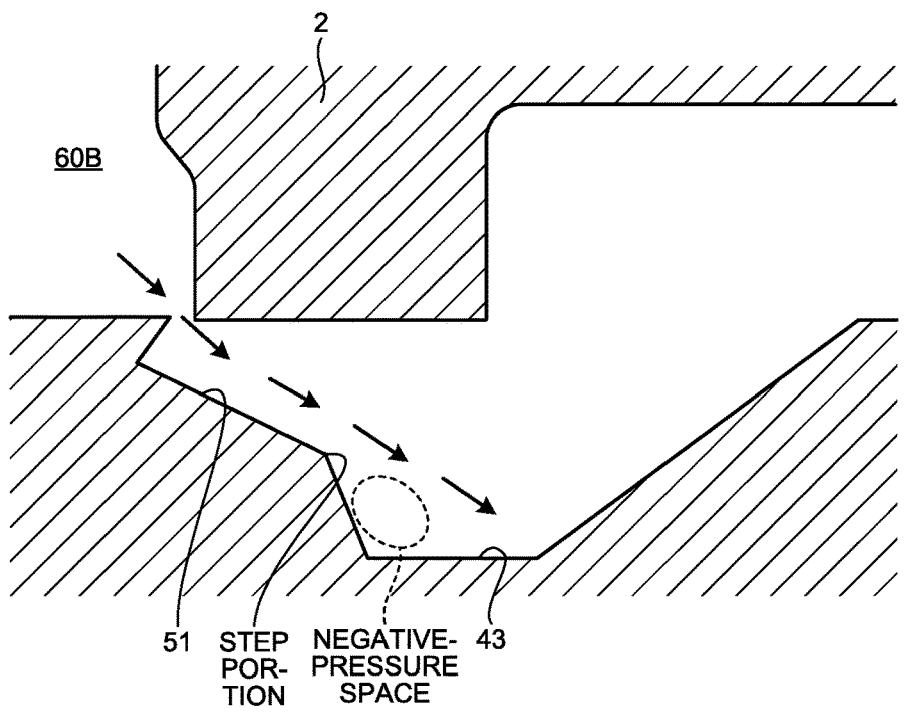
FIG. 9 is a schematic view for describing an action of a cutout portion according to a comparative example.

FIG. 9 is a schematic view for describing an action of a cutout portion according to a comparative example. As illustrated in FIG. 9, the bottom surface 51 and the outer surface 43 are not connected to each other directly. In a case where a step portion is formed between the bottom surface 51 and the outer surface 43, as illustrated in FIG. 9, a negative-pressure space is formed between the step portion and the outer surface 43. The negative pressure includes a component of force that causes the spool 4 to move in the same direction as the flow force. Therefore, the generation of the negative pressure causes an increase in the flow force that acts in the direction opposite to the moving direction of the spool 4.

In the present embodiment, as illustrated in FIG. 8, the bottom surface 51 and the outer surface 43 are connected to each other directly and smoothly. Therefore, the generation of the negative-pressure space is suppressed, and the flow force is reduced.

Furthermore, in the present embodiment, the small-diameter portion 31 has the straight body portion 311 adjacent to the first large-diameter portion 21, and the tapered portion 312 provided on the one side in the axial direction of the straight body portion 311. In addition, the end portion 43A at the one side in the axial direction of the outer surface 43 of the tapered portion 312 is directly connected to the end portion 42B at the other side in the axial direction of the second outer surface 42 of the second large-diameter portion 22. Therefore, as illustrated in FIG. 8, at least portion of the working oil that has flowed along the outer surface 43 of the straight body portion 311 flows the outer side in the radial direction from the end portion 43A of the outer surface 43 after flowing along the outer surface 43 of the tapered portion 312. Then, after hitting an inner surface of the valve body 2, the working oil flows while hitting the bottom surface 51. The flow of the working oil generates an effect to cause the flow from the annular groove 60B to surely hit the bottom surface 51 and flow along the bottom surface 51. Therefore, the generation of the negative pressure caused when the flow from the annular groove 60B gets away from the bottom surface 51 is prevented and thus, the flow force can be stably reduced.

As described above, according to the present embodiment, the bottom surface 51 of the cutout portion 50 is inclined toward the one side in the axial direction so as to approach the central axis AX of the spool 4. Therefore, it is possible to generate the force to cancel out the flow force. As a result, the decline in the fine control performance caused by the flow force is suppressed.

Moreover, in the present embodiment, the end portion 51A at the one side in the axial direction of the bottom surface 51 of the cutout portion 50 is connected to the end portion 43B at the other side in the axial direction of the outer surface 43 of the small-diameter portion 31. Accordingly, the generation of the negative-pressure space in the cutout portion 50 is suppressed, and the increase of the flow force is suppressed. As a result, the decline in the fine control performance caused by the flow force is suppressed more effectively.

In addition, in the present embodiment, the bottom surface 51 is a flat surface. Therefore, the working oil can smoothly flow along the bottom surface 51.

Furthermore, in the present embodiment, the small-diameter portion 31 has the straight body portion 311 and the tapered portion 312, and the end portion 43A at the one side in the axial direction of the outer surface 43 of the tapered portion 312 of the small-diameter portion 31 is connected to the end portion 42B at the other side in the axial direction of the second outer surface 42 of the second large-diameter portion 22. Accordingly, after hitting the inner side of the valve body 2, the working oil that has flowed along the straight body portion 311 and the tapered portion 312 can hit the bottom surface 51 so as to cancel out the flow force. As a result, the decline in the fine control performance caused by the flow force is suppressed even more effectively.

Figure 10:
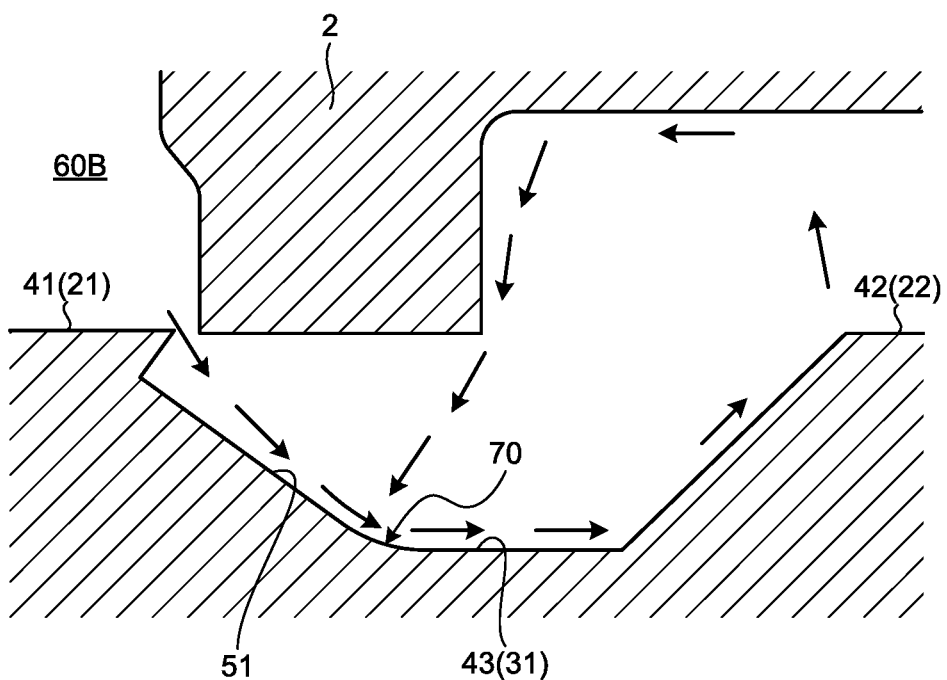
FIG. 10 is a partially enlarged cross-sectional view of the spool according to the present embodiment.

In the embodiment described above, as described with reference to FIG. 3 or FIG. 8, for example, in a cross-section including the central axis AX, the bottom surface 51 of the cutout portion 50 and the outer surface 43 of the small-diameter portion 31 have been linear and thus, a corner portion has been formed between the bottom surface 51 of the cutout portion 50 and the outer surface 43 of the small-diameter portion 31. However, as illustrated in FIG. 10, the end portion at the one side in the axial direction of the bottom surface 51 of the cutout portion 50 and the end portion at the other side in the axial direction of the outer surface 43 of the small-diameter portion 31 may be connected to each other via an arc-shaped curved surface 70. In other words, in the cross-section including the central axis AX, the linear bottom surface 51 of the cutout portion 50 and the linear outer surface 43 of the small-diameter portion 31 may be connected to each other via an arc-shaped curved line. By providing the curved surface 70, the working oil from the annular groove 60B flows along the bottom surface 51, and reaches the outer surface 43 of the small-diameter portion 31 after flowing through the curved surface 70 smoothly. Moreover, by providing the curved surface 70, the flow of the working oil becomes smooth and thus, the generation of the negative-pressure space is further suppressed and the increase of the flow force is further suppressed.

Note that, in the embodiment described above, the movement of the spool valve 1 when the boom of the excavator is lowered has been described as an example. However, the same effect described above can be obtained when the boom is raised.

Moreover, in the embodiment described above, an example in which the spool valve 1 is applied to the hydraulic cylinder (boom cylinder) that drives the boom has been described. However, the spool valve 1 may be applied to a hydraulic cylinder (arm cylinder) that drives an arm, or may be applied to a hydraulic cylinder (bucket cylinder) that drives a bucket. In addition, the spool valve 1 may be applied to a hydraulic cylinder that drives a blade of a bulldozer, or may be applied to a hydraulic cylinder that drives a working unit of a wheel loader.

Figure 11:
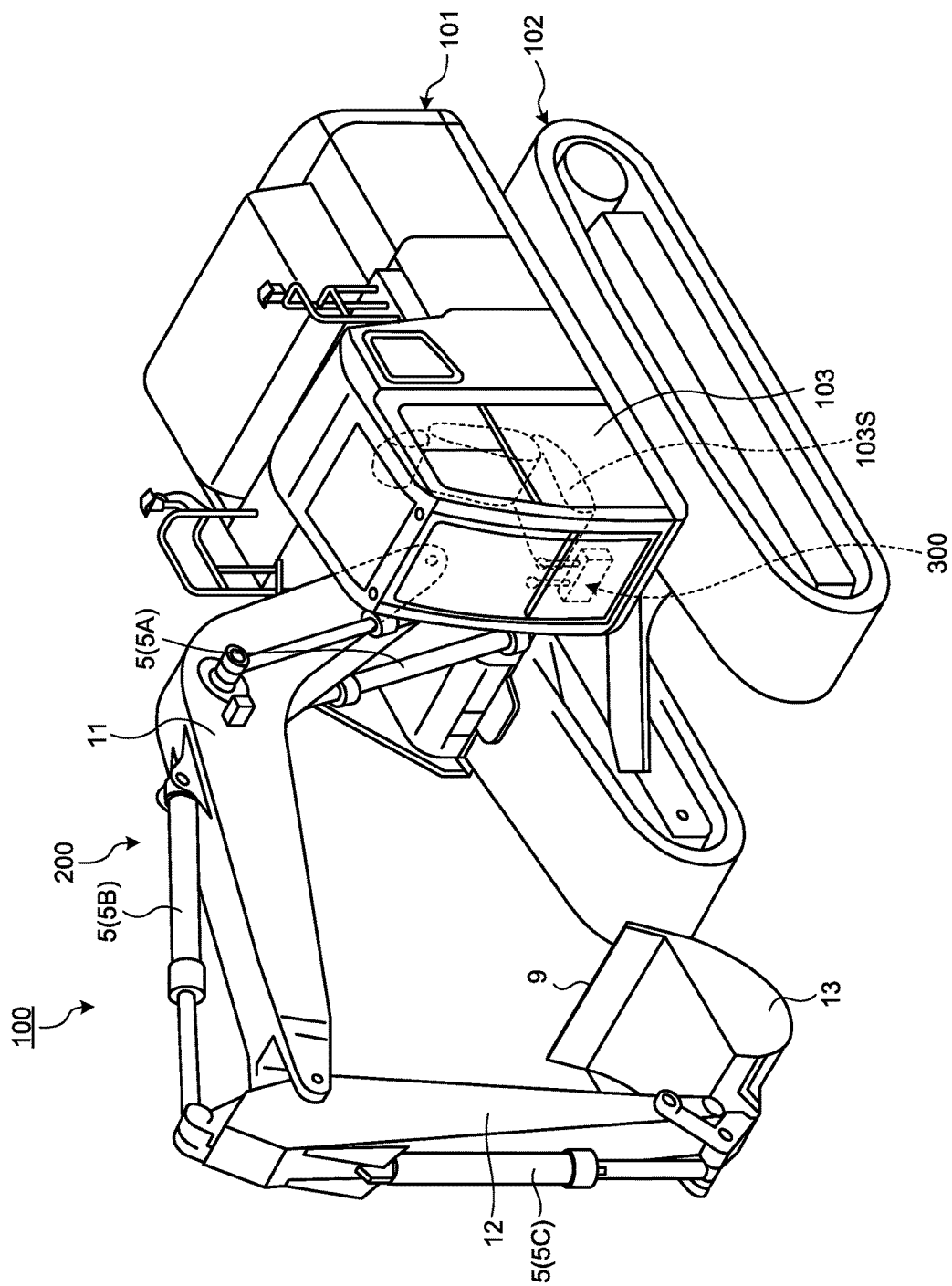
FIG. 11 is a schematic view illustrating an example of a work vehicle according to the present embodiment.

FIG. 11 is a diagram illustrating an example of a work vehicle 100 on which the spool valve 1 described in the embodiment above is mounted. In FIG. 11, the work vehicle 100 is an excavator.

As illustrated in FIG. 11, the excavator 100 includes a working unit 200, an upper swing body 101, a lower traveling body 102, and an operation device 300. The working unit 200 is actuated by hydraulic pressure. The upper swing body 101 is a vehicle body that supports the working unit 200. The lower traveling body 102 is a traveling device that supports the upper swing body 101. The operation device 300 is for operating the working unit 200. The upper swing body 101 has an operating room 103 on which the operator boards. The operating room 103 has a driver's seat 103S on which the operator sits. The lower traveling body 102 has a pair of crawler tracks. The excavator 100 travels by the rotation of the crawler tracks. The lower traveling body 102 may include tires.

The working unit 200 is supported by the upper swing body 101. The working unit 200 has the boom 11 coupled to the upper swing body 101, an arm 12 coupled to the boom 11, and a bucket 13 coupled to the arm 12. The boom 11 is actuated by the hydraulic cylinder 5 (boom cylinder 5A). The arm 12 is actuated by the hydraulic cylinder 5 (arm cylinder 5B). The bucket 13 is actuated by the hydraulic cylinder 5 (bucket cylinder 5C).

The operation device 300 is disposed in the operating room 103. The operation device 300 includes an operation member operated by the operator of the excavator 100. The spool valve 1 is operated by the operation of the operation device 300. The operator operates the operation device 300 to actuate the working unit 200. In the present embodiment, the operation device 300 includes a right working unit operation lever, and a left working unit operation lever.

When the right working unit operation lever in a neutral position is operated forward, the boom 11 is lowered, and when the right working unit operation lever is operated rearward, the boom 11 is raised. When the right working unit operation lever in the neutral position is operated rightward, the bucket 13 performs dumping, and when the right working unit operation lever is operated leftward, the bucket 13 performs excavation.

When the left working unit operation lever in a neutral position is operated forward, the arm 12 performs dumping, and when the left working unit operation lever is operated rearward, the arm 12 performs excavation. When the left working unit operation lever in the neutral position is operated rightward, the upper swing body 101 swings to the right, and when the left working unit operation lever is operated leftward, the upper swing body 101 swings to the left.

Note that the relationship between the operating directions of the right working unit operation lever and the left working unit operation lever, and the movement directions of the working unit 200, and the relationship between the operating directions of the operating levers and the swing directions of the upper swing body 101 do not have to be the relationships described above.

Figure 12:
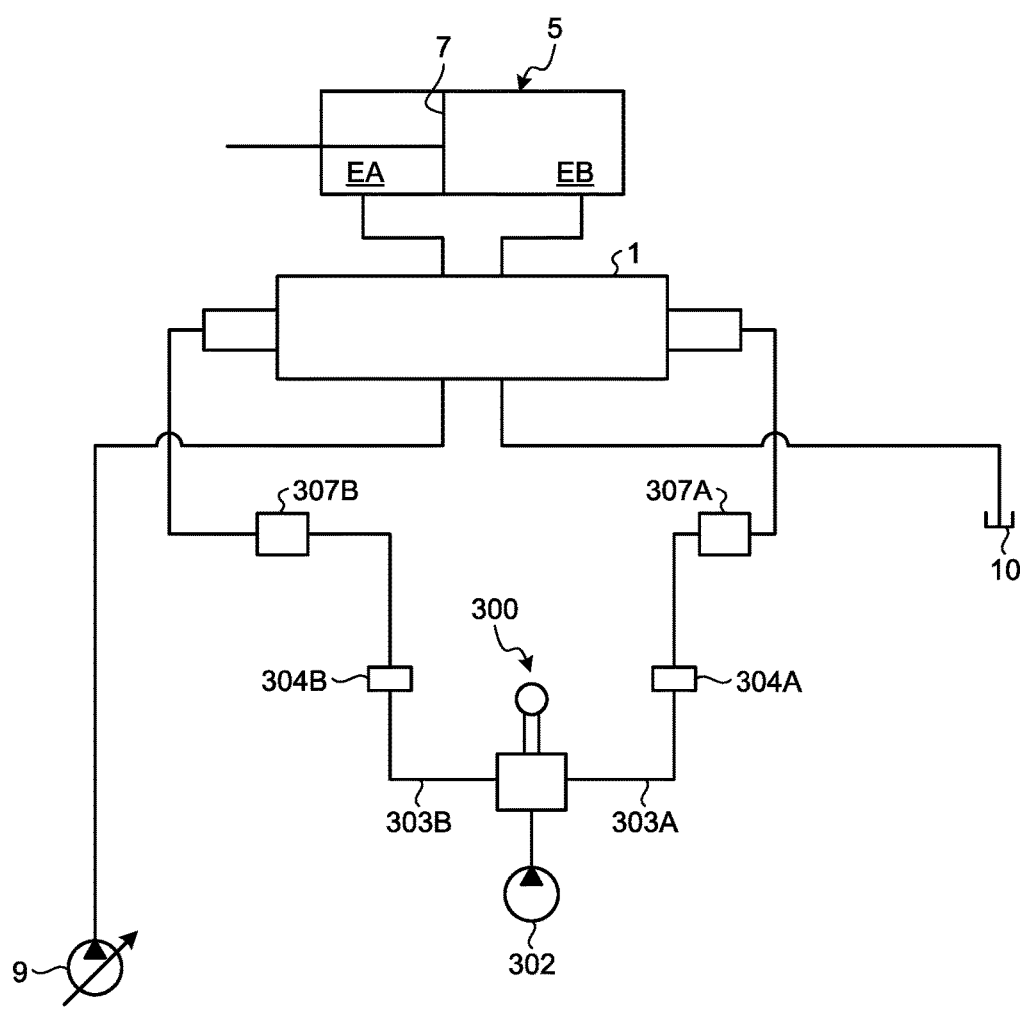
FIG. 12 is a diagram schematically illustrating an example of the spool valve and an operation device according to the present embodiment.

FIG. 12 is a diagram schematically illustrating an example of the spool valve 1 and the operation device 300. The supply of the working oil causes the hydraulic cylinder 5 to drive. The spool valve 1 controls the supply amount of the working oil to the hydraulic cylinder 5, and the direction in which the working oil flows.

A hydraulic system of the excavator 100 includes the hydraulic pump 9, a pilot-pressure pump 302, oil passages 303A and 303B, pressure sensors 304A and 304B, control valves 307A and 307B, and the operation device 300. The hydraulic pump 9 is a main hydraulic pump. The pilot-pressure pump 302 supplies pilot oil. The pilot oil flows through the oil passages 303A and 303B. The pressure sensors 304A and 304B are disposed in the oil passages 303A and 303B, respectively. The control valves 307A and 307B adjust the pilot pressure acted on the spool valve 1.

The operation device 300 includes the right working unit operation lever and the left working unit operation lever that adjust the pilot pressure on the spool valve 1. The right working unit operation lever and the left working unit operation lever of the operation device 300 are operation devices of pilot hydraulic pressure system.

The working oil supplied from the hydraulic pump 9 is supplied to the hydraulic cylinder 5 via the spool valve 1. The spool valve 1 is operated by the operation device 300. The pilot oil fed out from the pilot-pressure pump 302 is supplied to the operation device 300. Note that the pilot oil fed out from the hydraulic pump 9 and decompressed by a decompression valve may be supplied to the operation device 300. The operation device 300 includes a pilot-pressure adjusting valve. The control valves 307A and 307B are actuated based on the operation amount of the operation device 300, and the pilot pressure that acts on the spool 4 of the spool valve 1 is adjusted. The spool valve 1 is driven by the pilot pressure. The adjustment of the pilot pressure by the operation device 300 causes the moving amount, the moving speed, and the moving direction of the spool in the axial direction to be adjusted.

When the operation device 300 is operated and the spool 4 moves by the pilot pressure in the oil passage 303A, the working oil from the hydraulic pump 9 is supplied to the cylinder bottom-side oil chamber EB. In addition, when the operation device 300 is operated and the spool 4 moves by the pilot pressure in the oil passage 303B, the working oil from the hydraulic pump 9 is supplied to the cylinder head-side oil chamber EA.

REFERENCE SIGNS LIST

1 Spool valve
2 Valve body
3 Spool hole
4 Spool
5 Hydraulic cylinder
6 Cylinder
7 Piston
8 Cylinder rod
9 Hydraulic pump
10 Tank
11 Boom
12 Arm
13 Bucket
21 First large-diameter portion
22 Second large-diameter portion
23 Third large-diameter portion
24 Fourth large-diameter portion
30 Small-diameter portion
31 Small-diameter portion
32 Small-diameter portion
41 First outer surface
41A End portion
42 Second outer surface
42B End portion
43 Outer surface
43A End portion
43B End portion
44 End surface
44A End portion
44B End portion
45 Corner portion
50 Cutout portion
51 Bottom surface
52 Wall surface 60A Annular groove
60B Annular groove
70 Curved surface
100 Work vehicle
101 Upper swing body
102 Lower traveling body
103 Operating room
103S Driver's seat
200 Working unit
300 Operation device
A Head-side port
B Bottom-side port
P Pump port
T Tank port
EA Cylinder head-side oil chamber
EB Cylinder bottom-side oil chamber
LA Oil passage
LB Oil passage
LP Oil passage
LT Oil passage
PP1 Pilot pressure
PP2 Pilot pressure

The invention claimed is:

1. A spool valve comprising:
a valve body that has a spool hole; and
a spool disposed in the spool hole and movable in an axial direction to control flow of a working fluid, wherein
the spool has a first large-diameter portion, and a small-diameter portion provided on one side in the axial direction of the first large-diameter portion,
the first large-diameter portion has a first outer surface slidable along an inner surface of the spool hole, an end surface connected to an end portion at the one side in the axial direction of the first outer surface and to an end portion at the other side in the axial direction of a second outer surface of the small-diameter portion, and a cutout portion formed at a corner portion defined by an intersection of the first outer surface and the end surface of the first large-diameter portion, the second outer surface of the small-diameter portion having a straight body portion connected to the end surface of the first large-diameter portion, and
a bottom surface of the cutout portion is inclined toward the one side in the axial direction to approach a central axis of the spool and is a single flat surface, and the bottom surface and the straight body portion of the second outer surface of the small-diameter portion are connected to each other directly and smoothly, so that the working fluid flowing into the cutout portion and along the bottom surface, reaches the straight body portion of the second outer surface of the small-diameter portion, thereby reducing a flow force of the working fluid.

2. The spool valve according to claim 1, wherein
the bottom surface and the straight body portion of the second outer surface of the small-diameter portion are connected to each other via an arc-shaped curved surface.

3. The spool valve according to claim 1, wherein
the spool has a second large-diameter portion provided on the one side in the axial direction of the small-diameter portion,
the small-diameter portion has a tapered portion provided on the one side in the axial direction of the straight body portion, and
an end portion at the one side in the axial direction of an outer surface of the tapered portion is connected to an end portion at the other side in the axial direction of a second outer surface of the second large-diameter portion.

4. An operation device that operates the spool valve according to claim 1.

5. A work vehicle comprising the operation device according to claim 4.

* * * * *